(12) United States Patent
Jin et al.

(10) Patent No.: US 9,135,815 B2
(45) Date of Patent: Sep. 15, 2015

(54) METHODS AND SYSTEMS FOR RATING ROAD SEGMENTS

(71) Applicants: Ye Jin, Shanghai (CN); Qiwei Zhang, Shanghai (CN); Yinling Ni, Shanghai (CN); Lei Ding, Sichuan (CN); Ke Wang, Nanjing (CN); Daihui Zhu, Nanjing (CN)

(72) Inventors: Ye Jin, Shanghai (CN); Qiwei Zhang, Shanghai (CN); Yinling Ni, Shanghai (CN); Lei Ding, Sichuan (CN); Ke Wang, Nanjing (CN); Daihui Zhu, Nanjing (CN)

(73) Assignee: SAP SE, Walldorf (DE)

( * ) Notice: Subject to any disclaimer, the term of this patent is extended or adjusted under 35 U.S.C. 154(b) by 109 days.

(21) Appl. No.: 13/934,706

(22) Filed: Jul. 3, 2013

(65) Prior Publication Data

US 2015/0002319 A1    Jan. 1, 2015

(30) Foreign Application Priority Data

Jun. 28, 2013 (CN) .......................... 2013 1 0269463

(51) Int. Cl.

| | | |
|---|---|---|
| *G08G 1/123* | (2006.01) | |
| *G06F 19/00* | (2011.01) | |
| *G01S 1/00* | (2006.01) | |
| *G08G 1/01* | (2006.01) | |
| *G08G 1/00* | (2006.01) | |
| *G09B 29/00* | (2006.01) | |
| *H04W 4/02* | (2009.01) | |
| *H04W 4/04* | (2009.01) | |

(52) U.S. Cl.
CPC ............ *G08G 1/0112* (2013.01); *G08G 1/0129* (2013.01); *G08G 1/0141* (2013.01); *G08G 1/202* (2013.01); *G09B 29/007* (2013.01); *H04W 4/02* (2013.01); *H04W 4/028* (2013.01); *H04W 4/04* (2013.01)

(58) Field of Classification Search
CPC ............ G08G 1/205; G08G 1/096827; G08G 1/0104; G08G 1/096844; B61L 25/04; G09B 29/106; G01C 21/32
USPC ............... 340/989, 988, 993, 995.19, 995.27; 701/208, 450, 117, 414
See application file for complete search history.

(56) References Cited

U.S. PATENT DOCUMENTS

| | | | |
|---|---|---|---|
| 6,138,003 A | 10/2000 | Kingdon et al. | |
| 6,161,097 A | 12/2000 | Glass et al. | |
| 6,278,939 B1 * | 8/2001 | Robare et al. ................. | 701/431 |
| 7,283,846 B2 | 10/2007 | Spriestersbach et al. | |
| 7,412,234 B2 | 8/2008 | Zellner | |
| 7,996,038 B1 | 8/2011 | Fujisaki | |
| 8,046,003 B2 | 10/2011 | Lovell | |

(Continued)

FOREIGN PATENT DOCUMENTS

| | | |
|---|---|---|
| GB | 2483094 A | 2/2012 |
| JP | 2001109977 A | 4/2001 |
| WO | WO-2013034953 A1 | 3/2013 |

*Primary Examiner* — Travis Hunnings
*Assistant Examiner* — Munear Akki
(74) *Attorney, Agent, or Firm* — Buckley, Maschoff & Talwalkar LLC

(57) ABSTRACT

A method and system to obtain taxi location data for a plurality of taxis located in a geographic region; obtain street data for a plurality of streets operating in the geographic region, the street data defining a location of the plurality of streets; store the taxi location data and the street data in an in-memory database management system; generate a rating for the plurality of streets associated with at least one currently active taxi, the rating providing an indication of a likelihood the at least one currently active taxi is available for a fare; and provide an output of the rating.

20 Claims, 10 Drawing Sheets

(56) References Cited

U.S. PATENT DOCUMENTS

| | | |
|---|---|---|
| 2003/0068999 A1 | 4/2003 | Casali et al. |
| 2006/0276962 A1 | 12/2006 | Yoshioka et al. |
| 2008/0108328 A1 | 5/2008 | Lovell |
| 2008/0167959 A1 | 7/2008 | Lovell |
| 2012/0022717 A1* | 1/2012 | Oyabu et al. ............... 701/1 |
| 2012/0065871 A1* | 3/2012 | Deshpande et al. ......... 701/118 |
| 2012/0137256 A1 | 5/2012 | Lalancette et al. |
| 2012/0203599 A1* | 8/2012 | Choi et al. ............... 705/13 |

* cited by examiner

METHODS AND SYSTEMS FOR RATING ROAD SEGMENTS

FIELD

Some embodiments relate to database management systems. In particular, some embodiments concern methods and systems for analyzing and rating road segments stored in a database management system in an efficient and effective manner.

BACKGROUND

In some scenarios, such as a taxi management project use-case or context for example, a general question contemplated may be how to assist or guide a potential taxi passenger to a location where they are most likely to intercept an incoming available taxi, in a timely and efficient manner for both the potential passenger and the taxi. In some aspects, the behavior of taxis may be learned by, for example, examining historical data related to the taxis' past performance and status, including the taxis' location, speed, direction, etc.

However, the collection of taxi status data records for even a medium-sized metropolitan city may in some instances result, on average, in the generation of 200 records/second. At this example rate, about 7 billion records can be generated in about a four month period. Furthermore, in order to address the general question posed above, the records would need to be thoroughly analyzed regarding the taxis' status, and findings of the analysis would further need to be somehow utilized.

DETAILED DESCRIPTION

Figure 1:
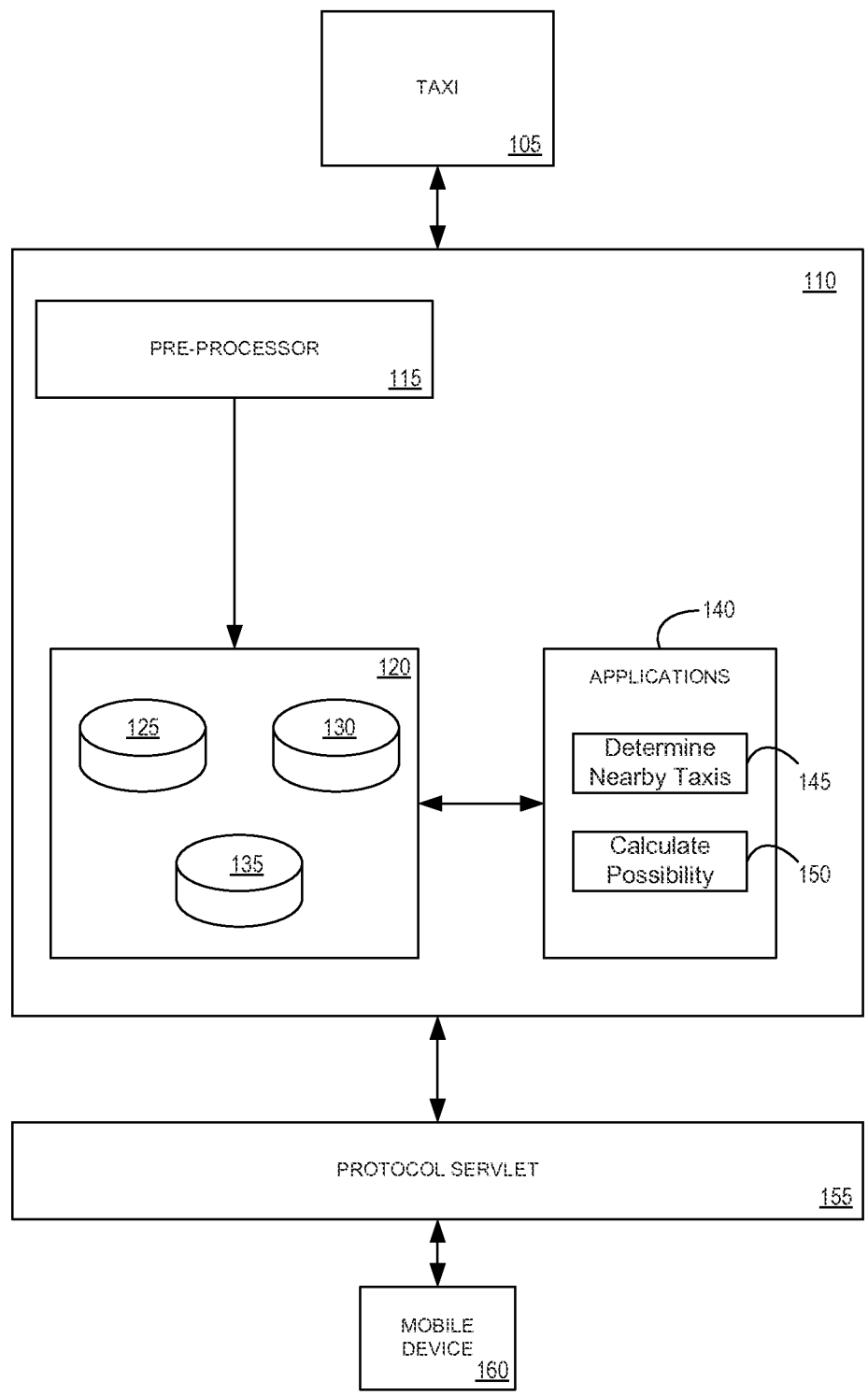
FIG. 1 is an illustrative depiction of a system architecture, according to some embodiments.

FIG. 1 is a block diagram of a system architecture according to some embodiments herein. In particular, FIG. 1 illustrates a system architecture 100 of a "street rating—taxi hailing" service, in accordance with some embodiments herein. Architecture 100 may support the processes disclosed herein, including processes and aspects thereof related to analyzing and rating street segments stored in a database management system.

More specifically, a taxi 105 may, at least periodically, provide location data related to its position to in-memory database 110. In some embodiments, the location data concerning a particular taxi may be provided on an ongoing basis at a rate of, for example, every 15-30 seconds. Accordingly, the amount of location data related to even a single taxi 105 operating within a given geographic location that may be reported and accumulated over even a short period of time (e.g., 1 month) be relatively immense. In embodiments herein, taxi 105 is as a logical representation of not one but many, and perhaps all, of the taxis operating within a given or subject geographical region. As such, taxi 105 may represent multiple taxis and the location data associated with all of those taxis. Taxi 105 may include a plurality of taxis, including in some embodiments, all of the licensed taxis in a particular geographic region.

In some aspects, the subject geographical region may include a city or town, a combination of cities or towns, a country, and other geographic regions and sub-regions without limit, including various combinations of the geographic regions and/or sub-regions. In some aspects, the location data may include, at least, a representation of longitude data and longitude data associated with an associated taxi at a given moment in time. The location data may be generated by a device on-board taxi 105 or another device (not shown) in communication with taxi 105. The communication protocol and technique used to transmit the location data from taxi 105 to database 110 may include any communication protocol now known or that becomes known in the future.

In some aspects, the location data associated with taxi 105 may not be received directly from taxi 105. In some instances, the location data may be received from a third party entity, such as a service provider or a data aggregator.

Database 110 may comprise any one or more systems to store data. The data stored in database 110 may be received from disparate hardware and software systems, some of which are not interoperational with one another. The systems may comprise a back-end data environment employed in a business or industrial context. The data may be pushed to database 110 and/or provided in response to queries received therefrom.

In some embodiments, database 110 is implemented in Random Access Memory (e.g., cache memory for storing recently-used data) and one or more fixed disks (e.g., persistent memory for storing the full database). Alternatively, database 110 may implement an "in-memory" database, in which volatile (e.g., non-disk-based) memory (e.g., Random Access Memory) is used both for cache memory and for storing the full database. In some embodiments, the data of the full database may comprise one or more of conventional tabular data, row-based data, column-based data, and object-based data. Database 110 may also or alternatively support multi-tenancy by providing multiple logical database systems which are programmatically isolated from one another. Moreover, the data of database 110 may be indexed and/or selectively replicated in an index.

According to some embodiments, database 110 executes a database server process to provide data to database applications. More specifically, database 110 may communicate with one or more database applications executed by application server 140 over one or more interfaces (e.g., a Structured Query Language (SQL)-based interface) in order to provide data thereto.

Application server 140 may execute database applications to provide, for example, a "street rating—taxi hailing" service and/or any other suitable functions. The database applications may, in turn, support client applications executed by end-user devices (e.g., mobile devices, tablet computers, desktop computers, laptop computers, smartphones, etc.). Such a client application may comprise a rich client application, an applet in a Web browser, or any other application to access and display interfaces generated by a database application.

Database 110, in some embodiments such as depicted in FIG. 1, may include a pre-processor 115. Pre-processor 115 may operate to condition or pre-process the location data related to taxi 105. In some aspects, pre-processor 115 may parse the location data for only specific information required or desired prior to any processing of the location data by database 110 that will be done in rendering the "street rating—taxi hailing" service. Pre-processor 115 may augment the location data related to taxi 105 by adding additional information thereto (e.g., data that may be deemed relevant to the taxi's location data but, for example, not generated by taxi 105 such as an indication of a convention or other special event occurring at the time of the location data collection). In some aspects, pre-processor 115 may operate to parse the location data relating to taxi 105 to limit, in some aspects at least, the data that will be stored and processed by database system 110. In some aspects, pre-processor 115 may condition, format, or otherwise pre-process the location data to package the location data in a configuration suitable for storage and processing by database 110.

Database system 110 may further include an in-memory storage facility or data source 120. Data source 120 may include one or more memory stores. In the example of FIG. 1, taxi location data may be stored at 125 and a position of a user (e.g., a potential taxi customer) may be stored at 130. In some aspects, as will be discussed in further detail below, the user's position data may be derived based on the indication of a location of a mobile device in the user's possession. In some aspects, the user location may correspond to a desired position of interest provided by, for example, the user, where the desired position is different from the user's actual (current) location. In some aspects, the user position data may include, at least, a representation of a longitude and a latitude representation of the user's actual position or a position of interest.

Data store 135 may include data related to a prediction or suggestion of where the user may possibly or (most) likely intercept a taxi available for hire (i.e., a fare). As will be discussed in greater detail herein, the prediction data may be determined based on a combination of historical data, such as the location data related to taxi 105 that may include representations of the location of taxi over a period of time. In some regards, the period of time the historical location data represents may vary to include, for example, a month, a three-month interval, a 1 year interval, and other intervals of time, including intervals of time that include a "sliding window" such as the last three months of location data for a taxi or group of taxis.

Database system 110 may include a application server 140 that accesses data source 120 and the data stored therein to execute a number of applications 145 and 150. Application server 140 may be an implementation of a query server. In some embodiments, applications 145 and 150 may be provided as a service to a consumer entity. Application 145 may be representative of an application that determines a location of taxis near a specific location in response to a query request for such information. For example, based on real time operating conditions, a query request to provide an indication of the taxis, if any, near a current location of a potential taxi customer may be received from a client device 160. Application 150 may be representative of an application that determines a predication of a possibility or likelihood of an available taxi at or near a specific location in response to a query request for such information. Aspects of the calculation or determination of the possibility or likelihood of an available taxi at or near a specific location will be discussed in greater detail below.

Protocol servlet 155 may extend the capabilities of the applications 145 and 150 hosted by server 140. Protocol servlet 155 may receive and respond to requests from clients 160, usually across HTTP, HyperText Transfer Protocol, although other protocols may be used in some implementations.

Figure 2:
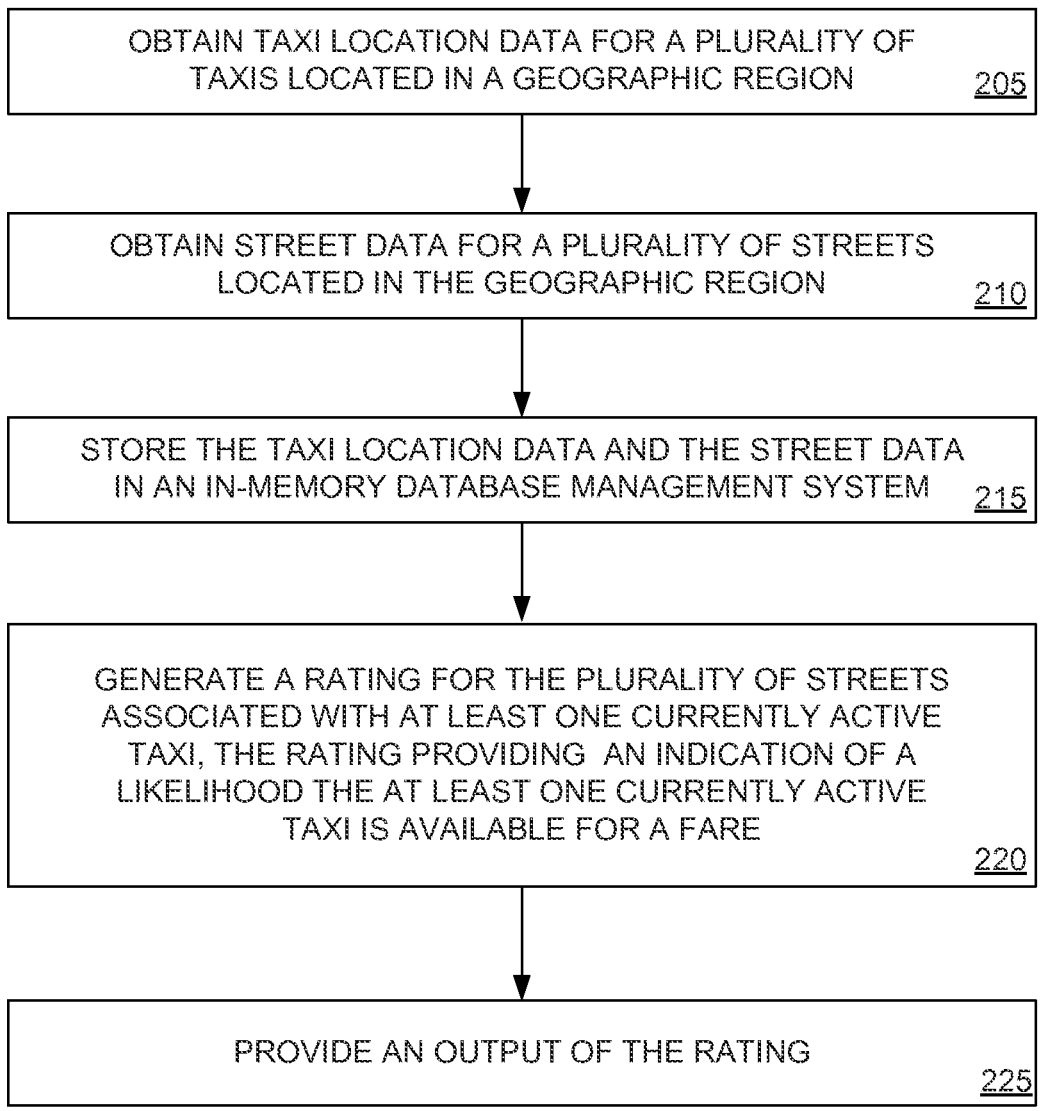
FIG. 2 is flow diagram of a process according to some embodiments.

FIG. 2 is an illustrative flow diagram of a process 200, for some embodiments herein. In particular, process 200 may relate to an overview of an embodiment to build a "street rating—taxi hailing" service supported by an in-memory database system, including applications for a mobile client device. At operation 205, taxi location data related to and representative of the location of a taxi is obtained. The location data may be received directly and indirectly from a taxi. Embodiments herein typically obtain location data relating to a plurality of taxis, where the taxis operate in a common geographic region. In some embodiments, the obtained location data may represent data associated with the location of taxis as the taxis actively traverse the geographic region to locate, pick up, transport, and drop off fare paying customers. The location data may be periodically obtained as the location data is generated by the taxi (e.g., messages or files received every 15-30 seconds) and the location data may, in some embodiments, be obtained in a batch mode wherein an accumulated collection of location data related to the taxis is received in a communication session with the taxis. In some embodiments, the location data may be obtained from a third-party service provider, aggregator, or another entity.

In some embodiments, the location data may include, at least, position information related to the taxi associated therewith. For example, the location data may include, at least, longitude data and longitude data indicative of a position of the associated taxi at the time the location data at the time of the location data generation. Other information may be included with the location data, including but not limited to global positioning satellite (GPS) data, assisted-GPS data, a speed of travel for the associated taxi, a bearing or orientation of the taxi, a speed and/or acceleration of travel for the associated taxi, and other "operational" and environmental parameters associated with the taxi. Operational parameters may include, for example, an indication of whether the taxi is occupied or unoccupied, make and model of the taxi, special amenities of the taxi, etc. Environmental parameters that may be included in the location data may include, without restriction, time of day, week, month, season, or year; whether there are any special/big/or relevant events that coincide with the location data collection (e.g., concerts, elections, government/religious holidays, major traffic construction and traffic jams, etc).

The location data obtained at operation 205 may be viewed as historical data since it is obtained over a period of time and provides a retrospective view of the taxis location over that period of time. In some respects, the location data may be "raw" in the sense that it is a representative collection of data points and additional analysis and processing of the location data is needed to determine any insight into the behavior(s) of the taxis operating in the geographic region. In some embodiments, the location data may be pre-processed by a database system receiving the location data (e.g., 110) to clean up or package the location data in a configuration desired and/or needed for processing by the database system. In some embodiments, the pre-processing of the location data may not be performed by system 110 but instead may be accomplished by a third-party service provider, if needed or done at all. If performed, the pre-processing may include, one or more of removing/parsing of the data to remove unwanted portions, basic or preliminary error correction of the location data, the addition of additional attributes, and other tasks to address incomplete, noisy, and inconsistent aspects of the obtained location data.

At operation 210, street data is obtained for a plurality of streets located in the geographic region. In some aspects, the street data may be received from a mapping data or service provider, including commercial, government, and open sources. The street data may be represented in a variety of formats and configurations, including varying levels of details and attributes associated with the streets. In some embodiments, the street data may include a start point and end point for a street, the permissible direction of travel on the street, the street's name, etc. In some embodiments, the plurality of streets may include a majority of the streets located in the particular subject geographic region.

At operation 215, the obtained taxi location data may be stored by the database management system in a memory accessible thereby for processing and analysis. In some embodiments, the taxi location data may be streamed to the system as it is obtained from, for example, a taxi operating in the geographic region. If subject to preprocessing, the pre-processed taxi location data is stored at operation 215. In some embodiments the street data may be stored as street segments, wherein a particular street is dived into a number of smaller street segments. Storing the street data as street segments may facilitate, for example, faster processing and analysis regarding the streets being processed herein. It is noted that the relationship between the streets and the street components comprising the particular streets may be maintained with the stored street data.

At operation 220, a rating for the plurality of streets associated with at least one currently active taxi is generated. As used herein, the rating relates to a street or more particularly to a street segment in the instance the street comprises street segments. Per the present disclosure, the rating provides an indication of a likelihood that the at least one active taxi operating on or near the plurality of streets is available for a fare. In accordance with some embodiments, calculations, determinations, and algorithms may be used to determine a specific street where the active taxi is currently and a status of each of the plurality of streets from a taxi traffic perspective. Such determined information may be used by some other analysis, calculations, determinations, and algorithms to generate a forward-looking prediction or suggestion of when and where a perspective or potential taxi customer may be more (or less) likely, that is possible, to catch or intercept an active taxi that is available for a fare.

In some embodiments, the generation of the rating is determined based on a combination of historical data, the past behavior of a plurality of taxis operating in a geographic region and representing a past period or interval of time, and current real time data such as the current location of active taxis and a current user location (whether an actual location of the user or a point of interest for the user). In some aspects, the rating may be categorized into at least two different rating levels, where each rating level conveys a different relative likelihood that at least one active taxi is operating on or near the plurality of streets and is available for a fare.

At operation 225, an output of the rating is generated and provided for consumption. The output of the rating may include a file representation of a visualization. In some embodiments, the output of the rating may be consumed by a device or system executing an application or "app" that interfaces and communicates with a system that generates the rating of the streets, in accordance with process 200 such as the "street rating—taxi hailing" service provided by system 110. In some embodiments, a mobile client device such a mobile telephone, smartphone, or tablet may be equipped with an app to receive and display the visualization of the rating represented by the output file.

Figure 3:
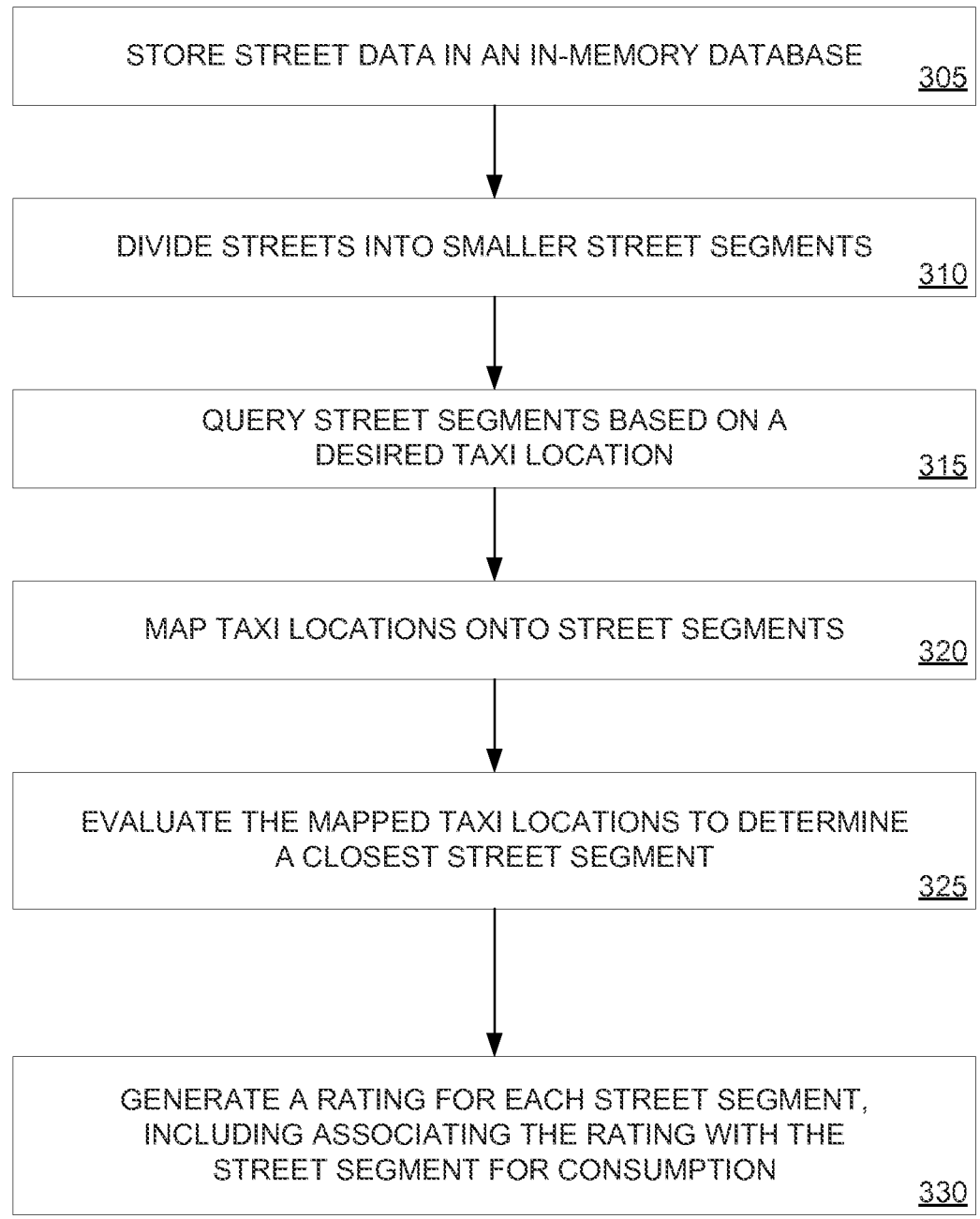
FIG. 3 is flow diagram of a process, according to some embodiments.

FIG. 3 is an illustrative flow diagram of a process 300. In particular, process 300 may relate to an embodiment and aspects of a process or algorithm for rating streets for a "street rating—taxi hailing" service supported by an in-memory database system. At operation 305, street data may be received or otherwise obtained by the system for storage and further processing. The street data may define, at the least, a start point for a street and an end point for the street. As such, the street data may, in some instances, represent data including a pair of (latitude and longitude) data points.

At operation 310, individual streets may be divided into a plurality of street segments. For example, for each street longer than T, the street may be divided into multiple street segments, where each street segment is shorter than T. In some embodiments, a map of a geographic region may be divided into a number of adjacent grids. Furthermore, each of the streets and by extension the street segments comprising the streets, may be located in at least one grid of the mapped geographic region. In some aspects, a street segment may thus be seen to belong to or be associated with at least one grid. The grid associated with a street segment may be identified and also stored with or part of the street location data.

At operation 315, at least one street segment may be queried based on a desired location. The desired location may correspond to an actual location of a client device user or a point of interest for the client device user, where the client device interfaces with a system (e.g., 110) providing the "street rating—taxi hailing" service and a server (e.g., 140). The query may seek to return a result of the streets located near the queried street (i.e., the user's desired location). In some aspects, a result returned in response to execution of the query may include all streets determined to be near the desired location. In some embodiments, "near" may refer to a parameter having a value that is fixed, variable based on other parameters, or tuneable by a device, system administrator, or other entity. In some embodiments, the query execution may include, a search based on the "grids" of the geographic region. For example, a grid of the mapped geographic region that contains the location of the desired street being queried may be identified and all relevant streets located in the identified grid may be determined to be near the desired street location.

At operation 320, a current taxi location is mapped onto the plurality of streets since one objective of process 300 is to determine on which specific street(s) a currently active taxi is operating. The process for determining the street location for an active taxi may be addressed by one or more different calculations or algorithms.

Figure 4:
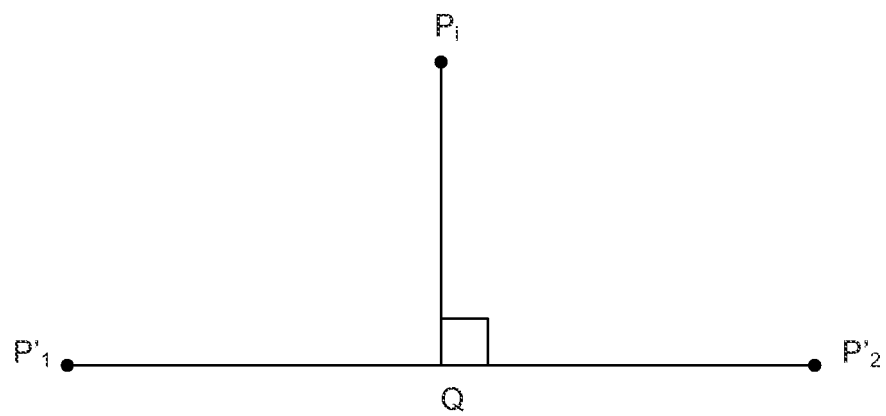
FIG. 4 is a depiction of a mapping feature, in accordance with some embodiments herein.

In some embodiments, an algorithm or process for determining the street location for an active taxi may include mapping the taxi points to a standard map. FIG. 4 provides an example of a mapping convention that may be used in some embodiments herein. With reference to FIG. 4, a taxi's location may be mapped into each street. From taxi location $P_i$, $P'_i$ indicates the taxi points; $P'_1P'_2$ indicates the annotated points in the OSM (OpenStreeMap); Q is the foot point of the line $P_iQ$ and $P'_1P'_2$. From taxi location $P_i$, a result of the mapping of the taxi location may include a vector for each street comprising <PiQ, speed, direction>.

Referring to process 300 of FIG. 3 at operation 325, the mapped taxi location may be evaluated to determine a "closest" street segment. In some aspects, the evaluation for the "closest" street to the taxi's mapped location may include evaluating an evaluation function W, where function W(<PiQ, speed, direction>) will return one evaluation double value for each street $P'_1P'_2$, and return the "closest" street identity together with vector <PiQ, speed, direction>.

In some embodiments, the particular specific techniques of mapping the taxi locations of operation 320 and the evaluation of the mapped taxi locations of operation 325 may differ from the specific examples discussed above. These embodiments are also compatible with and may adhere to the other aspects of the present disclosure, including, for example, process 300.

At operation 330, a rating for each street segment is generated. The generation of the rating may include one or more operations for associating the rating with a particular segment. In some embodiments, operation 330 may include calculating a rating for a street segment for each taxi, getting an average speed of the taxi on that street segment, and further converting the speed to some visualization representation for presentation on a client device. For example, a taxi mapped to a particular street segment may be represented by a particular graphical user interface element (i.e., an icon) on a map of a geographic region that includes the street segment, where the graphical user interface element is a first color for a taxi traveling below a threshold speed and a second color for the taxi traveling at or above the threshold speed.

In some embodiments, operations 315, 320, and 325 may be performed for each taxi until every active taxi is accurately mapped to its own street segment. In some aspects, an average speed for each relevant street segment may be calculated. And, based on a "speed to color" algorithm, a color code for each street segment with a taxi may be obtained, where the displayed taxi will be displayed with the appropriate color.

In some aspects, the process of flow diagram 300 may be packaged within an in-memory database to provide service that may be accessed by a mobile client via, for example, a Http JSON (JavaScript Object Notation) format.

Figure 5:
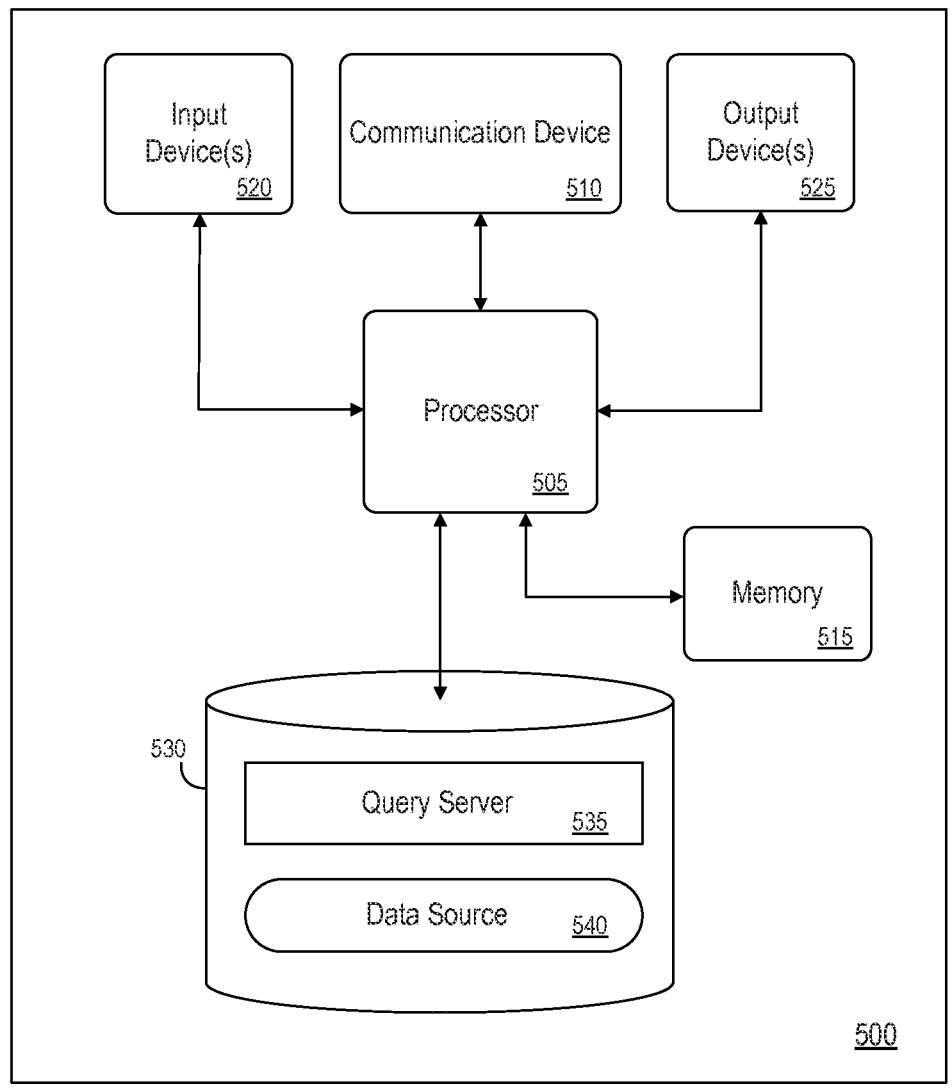
FIG. 5 is an illustrative block diagram of an apparatus, in accordance with some embodiments herein.

FIG. 5 is a block diagram of apparatus 500 according to some embodiments. Apparatus 500 may comprise a general-purpose computing apparatus and may execute program code or instructions to perform any of the processes described herein. Apparatus 500 may comprise an implementation of query server 140 and in-memory database 110. Apparatus 500 may include other unshown elements according to some embodiments.

Apparatus 500 includes processor 505 operatively coupled to communication device 510, data storage device 530, one or more input devices 520, one or more output devices 525 and memory 515. Communication device 510 may facilitate communication with external devices, such as a client device or a data storage device. Input device(s) 520 may comprise, for example, a keyboard, a keypad, a mouse or other pointing device, a microphone, knob or a switch, an infra-red (IR) port, a docking station, and/or a touch screen. Input device(s) 520 may be used, for example, to enter information into apparatus 500. Output device(s) 525 may comprise, for example, a display (e.g., a display screen) a speaker, and/or a printer.

Data storage device 530 may comprise any appropriate persistent storage device, including combinations of magnetic storage devices (e.g., magnetic tape, hard disk drives and flash memory), optical storage devices, Read Only Memory (ROM) devices, etc., while memory 515 may comprise Random Access Memory (RAM).

Query server 535 may comprise program code executed by processor 505 to cause apparatus 500 to perform any one or more of the processes described herein (e.g., process 300). Embodiments are not limited to execution of these processes by a single apparatus. Data source 540 may implement data source 120 as described above. As also described above, data source 540 may be implemented in volatile memory. Data storage device 530 may also store data and other program code for providing additional functionality and/or which are necessary for operation of apparatus 500, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 and/or system 500 may include a processor to execute program code such that the computing device operates as described herein.

All processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Figure 6:
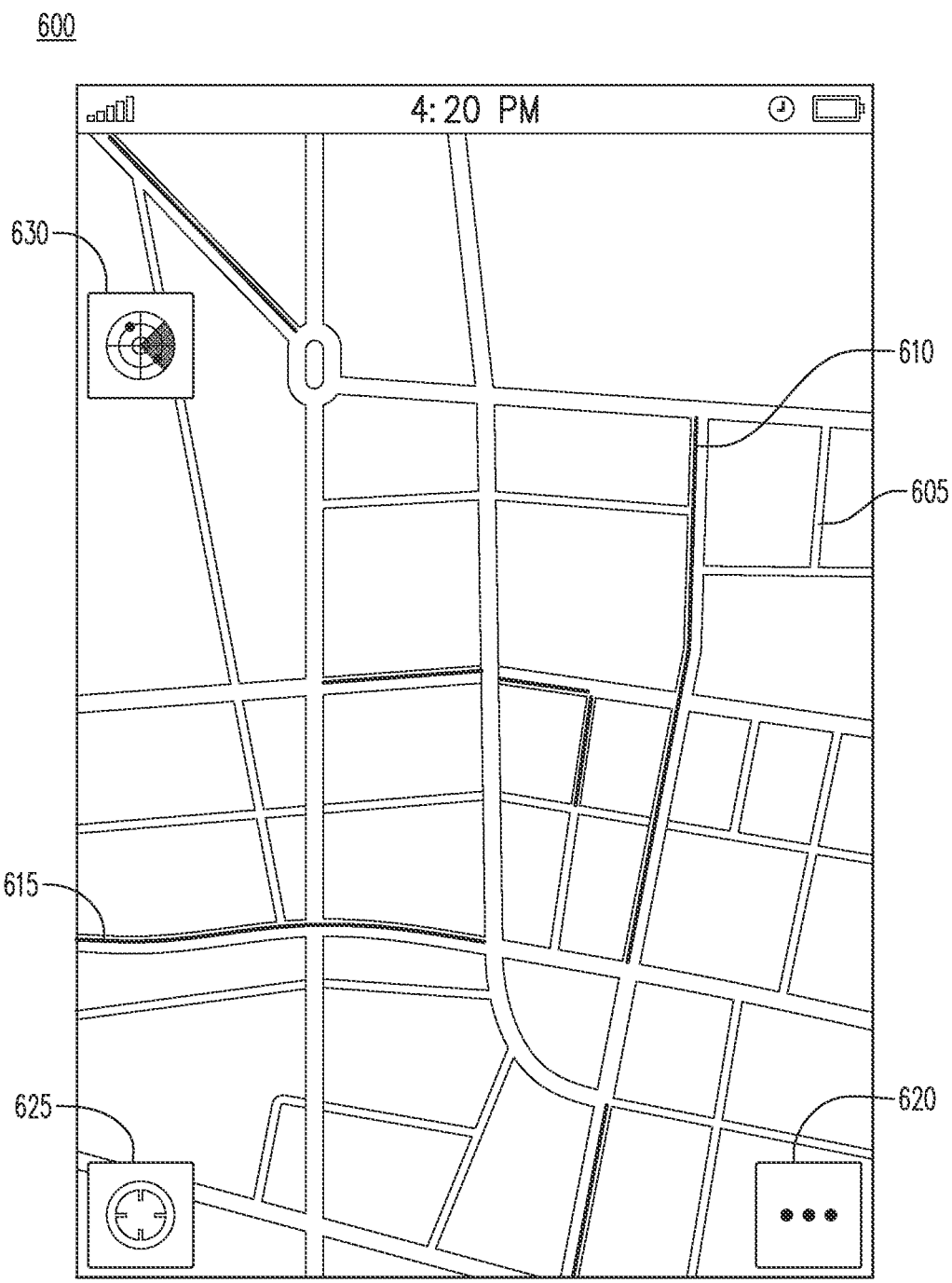
FIGS. 6-13 are outward views of a graphical user interface, according to some embodiments.

FIG. 6 is an illustrative depiction of a user interface 600 that may be presented in a display panel of a graphical user interface (GUI) of a client device (e.g., mobile device 160), in accordance with some aspects herein. User interface 600 may comprise a touchscreen responsive to touches, swipes, gestures, and other modes of user input based or interactions with the touchscreen and/or other components of the client device such as, for example, a motion detector, a camera, an accelerometer, etc. Regarding user interface 600, a map of a section of a city is shown in the display panel. Additionally, a plurality of streets including for example, streets 610 and 615 are shown having at least a portion thereof overlaid with visualizations representing a rating for the streets. The street rating visualization in FIG. 6 is represented by a line having one of a plurality of colors, where different colors correspond to different ratings for the street. The color may correlate to the possibility or likelihood of a taxi being available on the particular street, as disclosed herein. The use of different colors may facilitate communicating the rating of a street to a user in a fast and efficient manner. User interface 600 includes a number of graphical user interfaced elements, including menu icon 620, a location icon 625, and a radar navigation icon 630.

Figure 7:
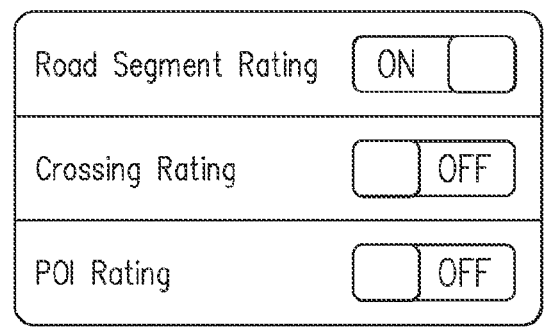
Figure 8:
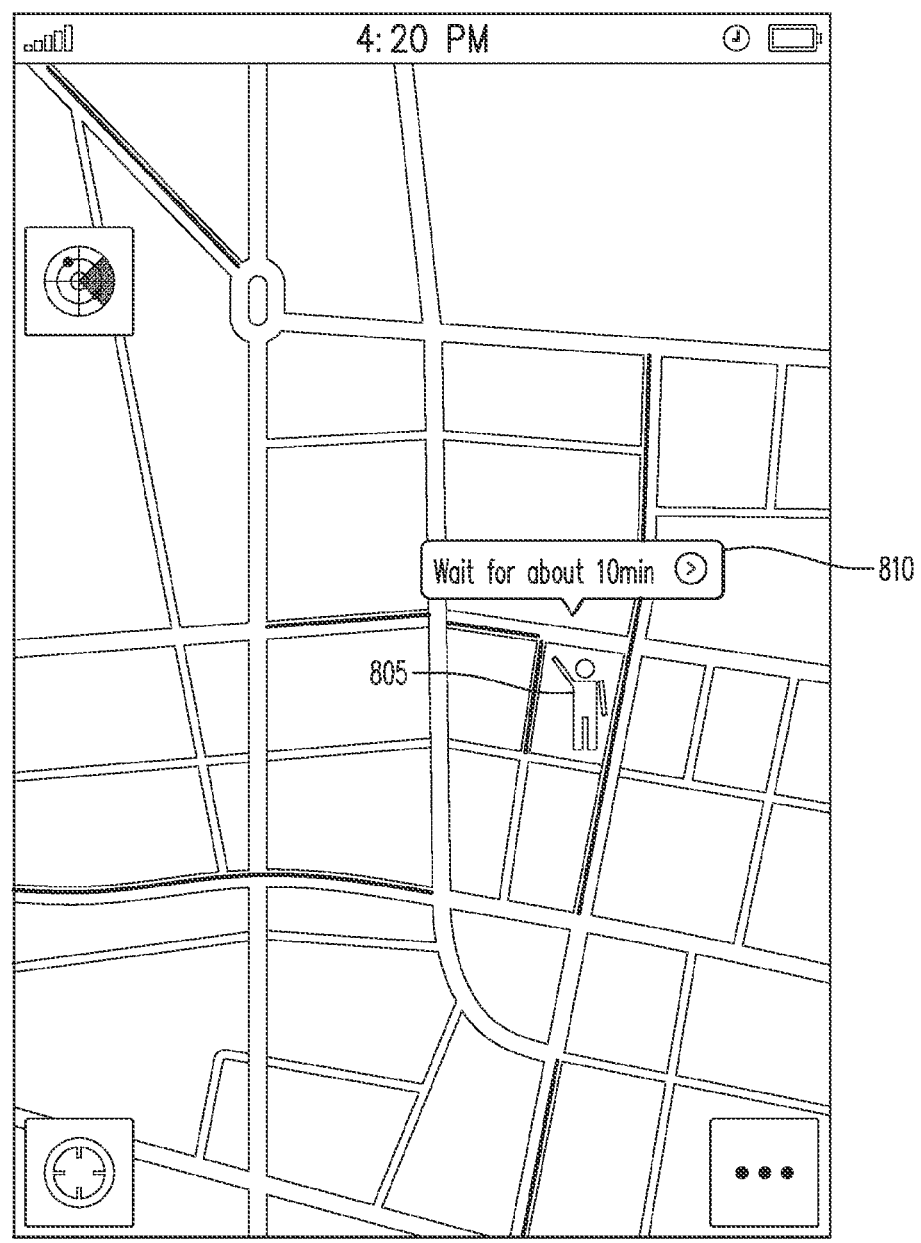

Selecting menu icon 620 may cause menu 700 to be displayed, as illustrated in FIG. 7. Menu 700 shows the Road Segment Rating feature is activated. Having activated the Road Segment Rating feature per menu 700, user interface 800 of FIG. 8 may be displayed in the display panel of the client device. User interface 800 includes a plurality of streets and their associated rating in the vicinity of the user's current location 805. Additionally, the user's current location 805 may display a projected wait time the user may be expected to experience given their current location, historical taxi traffic in the vicinity of that location, the time of day, etc.

Figure 9:
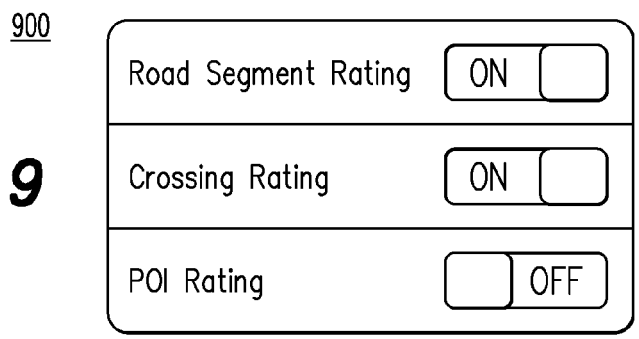
Figure 10:
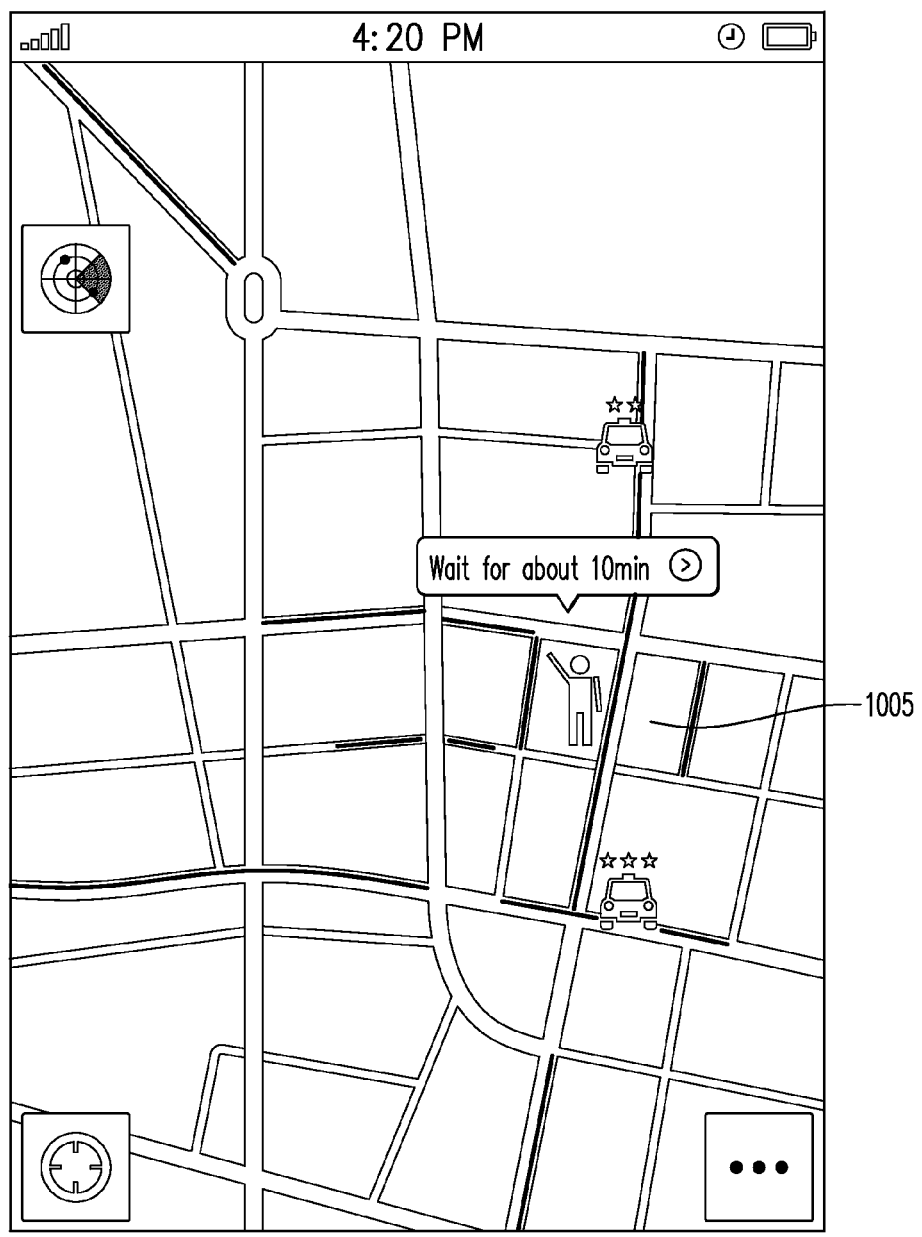

Selecting menu icon 620 may cause menu 900 to be displayed, as illustrated in FIG. 9. Menu 900 is similar to menu 700 but shows the Road Segment Rating feature and the Crossing Rating feature as both being activated. Having activated both the Road Segment Rating feature and the Crossing Rating feature per menu 900, user interface 1000 of FIG. 10 may be displayed in the display panel of the client device. User interface 1000 includes a plurality of streets and their associated rating in the vicinity of the user's current location 1005. Additionally, the cross streets to the user's current street location determined to have the highest street rating are also displayed in user interface 1005. In some embodiments, the top 3, 5, or some other predetermined or preselected number of cross street's ratings may be displayed upon activation of the Cross Rating feature.

Figure 11:
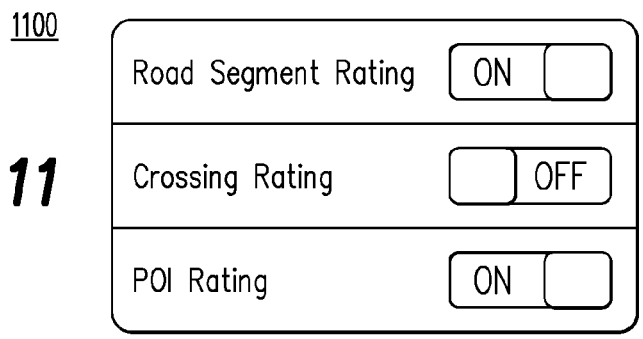
Figure 12:
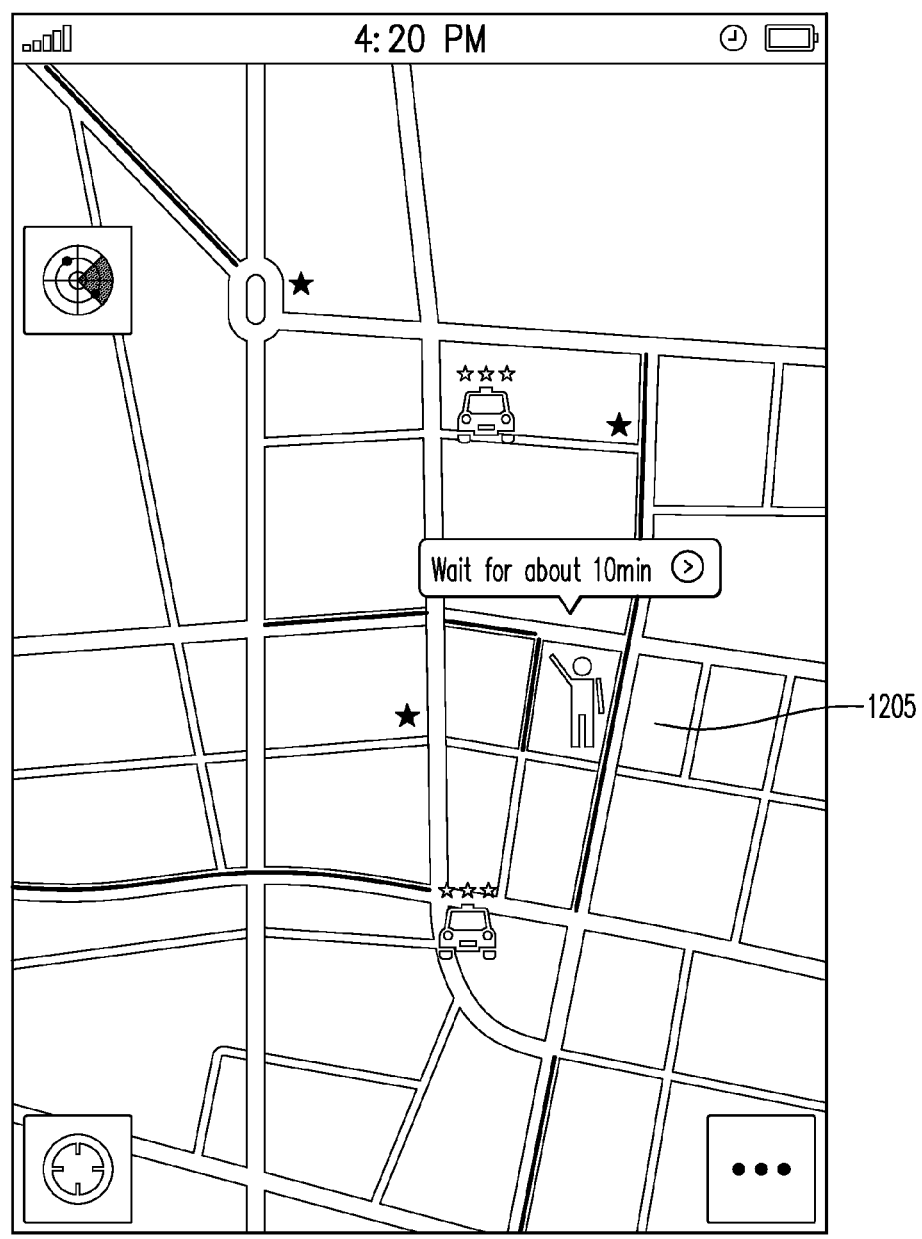

Selecting menu icon 620 may cause menu 1100 to be displayed, as illustrated in FIG. 11. Menu 1100 is similar to menus 700 and 900 but shows the Road Segment Rating feature and the POI (point of interest) feature as both being activated. Having activated the both the Road Segment Rating feature and the POI feature per menu 1100, user interface 1200 of FIG. 12 may be displayed in the display panel of the client device. User interface 1200 includes a plurality of streets and their associated rating in the vicinity of the user's current location 1205. Additionally, a number of the user's designated POIs are also displayed in user interface 1205. In some embodiments, the top 3, 5, or some other predetermined or pre-selected number of POIs may be displayed upon activation of the POI feature. In some embodiments, a user of the client device may designate a POI and/or a number of default POIs may be associated with the mapped location (e.g., city). In some aspects, a POI may relate to a location frequently visited by the user, such as, for example, their place of work, a favorite restaurant or coffee shop, etc.

Figure 13:
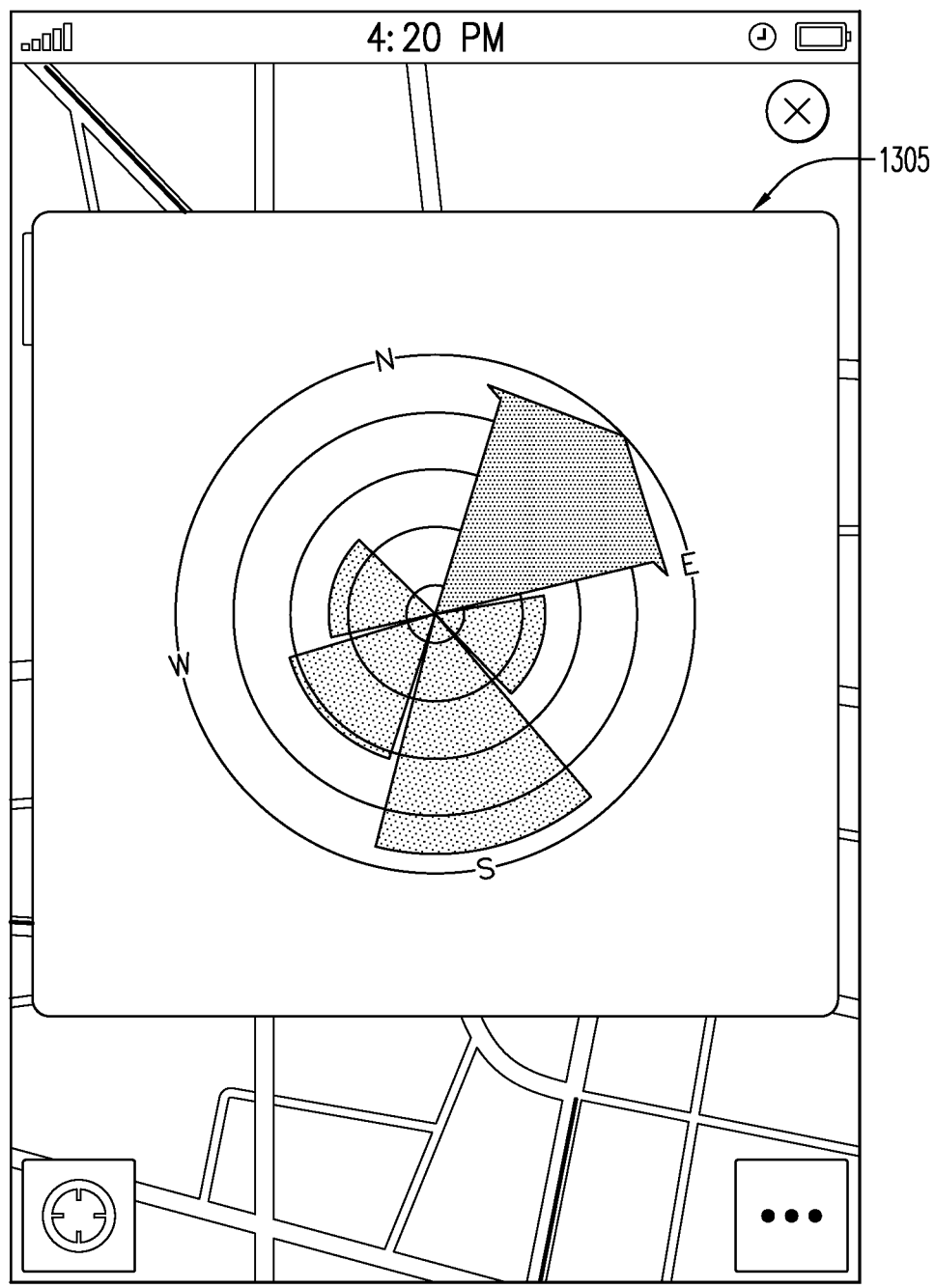

Selecting radar icon 630 may cause menu 1300 to be displayed, as illustrated in FIG. 13. Menu 1300 shows a Radar overlay 1305 in the display panel of the client device. The Radar overly may present a visualization that conveys, at a high level, a navigation aid to direct a user to a high street rating area. For example, the Radar overlay of FIG. 13 provides an easy-to-read visual cue that the direction of the higher rating streets in the vicinity of the user are located in the northeast direction.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A computer-implemented method, the method comprising:
    obtaining taxi location data for a plurality of taxis operating in a geographic region;
    obtaining street data for a plurality of streets located in the geographic region, the street data defining a location of the plurality of streets;
    storing the taxi location data and the street data in an in-memory database management system;
    generating a rating for each of the plurality of streets on or near which at least one currently active taxi is located, the rating for a particular street providing an indication of a likelihood that the at least one currently active taxi operating on or near the particular street is available for a fare; and
    providing an output of the rating.

2. The method of claim 1, wherein the taxi location data comprises a position for each of the plurality of taxis represented by at least longitude data and latitude data.

3. The method of claim 2, wherein the taxi location further comprises, at least one of weather data, a timestamp, a bearing, a speed of travel, and a value for an environmental parameter.

4. The method of claim 1, wherein the street data comprises a plurality of street segments for the plurality of streets.

5. The method of claim 1, wherein the generating of the rating comprises:
    mapping the at least one currently active taxi to a specific one of the plurality of streets; and
    determining the likelihood at least one taxi is available for a fare on the specific one of the plurality of streets based on the taxi location data, wherein the taxi location data is historical data.

6. The method of claim 1, wherein the output includes a visualization representation of, at least, the at least one currently active taxi and the rating for the plurality of streets associated with at least one currently active taxi.

7. The method of claim 1, further comprising providing the output of the rating for transmission to a mobile device.

8. A non-transitory computer-readable medium storing executable program instructions thereon, the medium comprising:
    instructions to obtain taxi location data for a plurality of taxis operating in a geographic region;
    instructions to obtain street data for a plurality of streets located in the geographic region, the street data defining a location of the plurality of streets;
    instructions to store the taxi location data and the street data in an in-memory database management system;
    instructions to generate a rating for each of the plurality of streets on or near which at least one currently active taxi is located, the rating for a particular street providing an indication of a likelihood that the at least one currently active taxi operating on or near the particular street is available for a fare; and
    instructions to provide an output of the rating.

9. The medium of claim 8, wherein the taxi location data comprises a position for each of the plurality of taxis represented by at least longitude data and latitude data.

10. The medium of claim 9, wherein the taxi location further comprises, at least one of weather data, a timestamp, a bearing, a speed of travel, and a value for an environmental parameter.

11. The medium of claim 8, wherein the street data comprises a plurality of street segments for the plurality of streets.

12. The medium of claim 8, further comprising, to generate the rating:
    instructions to map the at least one currently active taxi to a specific one of the plurality of streets; and
    instructions to determine the likelihood at least one taxi is available for a fare on the specific one of the plurality of streets based on the taxi location data, wherein the taxi location data is historical data.

13. The medium of claim 8, wherein the output includes a visualization representation of, at least, the at least one currently active taxi and the rating for the plurality of streets associated with at least one currently active taxi.

14. The medium of claim 8, further comprising instruction to provide the output of the rating for transmission to a mobile device.

15. A system comprising:
a computing device comprising:
a memory storing processor-executable program code; and
a processor to execute the processor-executable program code in order to cause the computing device to:
obtain taxi location data for a plurality of taxis operating in a geographic region;
obtain street data for a plurality of streets located in the geographic region, the street data defining a location of the plurality of streets;
store the taxi location data and the street data in an in-memory database management system;
generate a rating for each of the plurality of streets on or near which at least one currently active taxi is located, the rating for a particular street providing an indication of a likelihood that the at least one currently active taxi operating on or near the particular street is available for a fare; and
provide an output of the rating.

16. The system of claim 15, wherein the taxi location data comprises a position for each of the plurality of taxis represented by at least longitude data and latitude data.

17. The system of claim 16, wherein the taxi location further comprises, at least one of weather data, a timestamp, a bearing, a speed of travel, and a value for an environmental parameter.

18. The system of claim 15, wherein the street data comprises a plurality of street segments for the plurality of streets.

19. The system of claim 15, wherein to generate the rating comprises:
mapping the at least one currently active taxi to a specific one of the plurality of streets; and
determining the likelihood at least one taxi is available for a fare on the specific one of the plurality of streets based on the taxi location data, wherein the taxi location data is historical data.

20. The system of claim 15, wherein the output includes a visualization representation of, at least, the at least one currently active taxi and the rating for the plurality of streets associated with at least one currently active taxi.

* * * * *